United States Patent [19]

Forbes et al.

[11] Patent Number: 5,027,948
[45] Date of Patent: Jul. 2, 1991

[54] DELIVERY HOUSING FOR VIDEO TAPE CASSETTES AND THE LIKE

[76] Inventors: Alan L. Forbes, 216 Roma St.; David F. Goodwin, 222 Elder St., both of Redlands, Calif. 92373; Charles A. Jannelli, 619 Daisy Ct., Redlands, Calif. 92374

[21] Appl. No.: 567,753

[22] Filed: Aug. 15, 1990

[51] Int. Cl.5 .......................................... B65D 85/672
[52] U.S. Cl. ................... 206/387; 206/806; 232/1 E; 232/43.1; 232/43.4; 220/482; 220/210
[58] Field of Search ................ 206/1.5, 387, 806; 220/210, 476, 480, 482; 232/1 A, 1 E, 43.1, 43.4

[56] References Cited

U.S. PATENT DOCUMENTS

| 1,880,817 | 10/1932 | Coleman . | |
| 2,543,751 | 3/1951 | Atkinson | 232/1 D |
| 2,779,560 | 1/1957 | Springer | 220/480 |
| 3,082,902 | 3/1963 | Kimbrough, Jr. | 220/480 |
| 3,640,451 | 2/1972 | Lewis | 232/43.1 |
| 4,484,692 | 11/1984 | Palermo et al. | 220/476 |
| 4,494,690 | 1/1985 | Dupuis | 232/43.1 |
| 4,548,330 | 10/1985 | Hewitt et al. | 220/210 |
| 4,703,850 | 11/1987 | Walker | 206/806 |
| 4,746,062 | 5/1988 | Bartylla . | |
| 4,901,912 | 2/1990 | Pinard . | |

FOREIGN PATENT DOCUMENTS

| 1308061 | 9/1962 | France | 232/43.1 |
| 2450751 | 11/1980 | France | 206/806 |
| 2455134 | 11/1980 | France | 220/482 |
| 2582435 | 11/1986 | France | 206/387 |

*Primary Examiner*—David T. Fidei
*Attorney, Agent, or Firm*—John H. Crowe

[57] ABSTRACT

An open-ended container for temporarily storing video tape cassettes, etc., having an inverted U-shaped bracket at its upper end adapted to be mounted over the upper edge of an entrance door when the latter is open. When the door is closed, the container cannot be removed and access to the upper end of the container is prevented, but when the door is opened the container may be removed and access may be had to its interior. A lockable access member at the lower end of the container enables a delivery person to gain access to the container even when the door is closed.

4 Claims, 1 Drawing Sheet

U.S. Patent         July 2, 1991         5,027,948
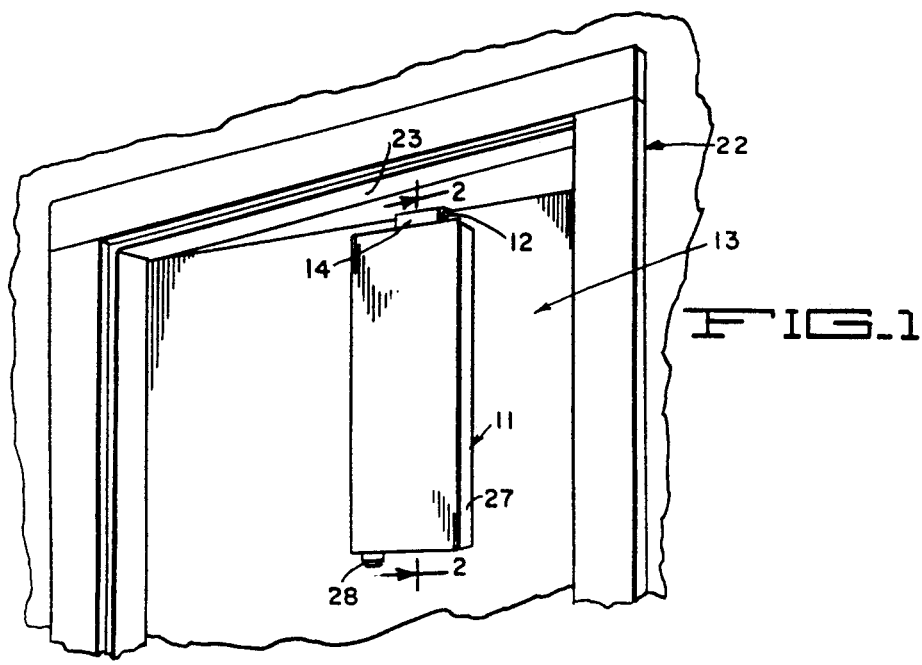
FIG.1
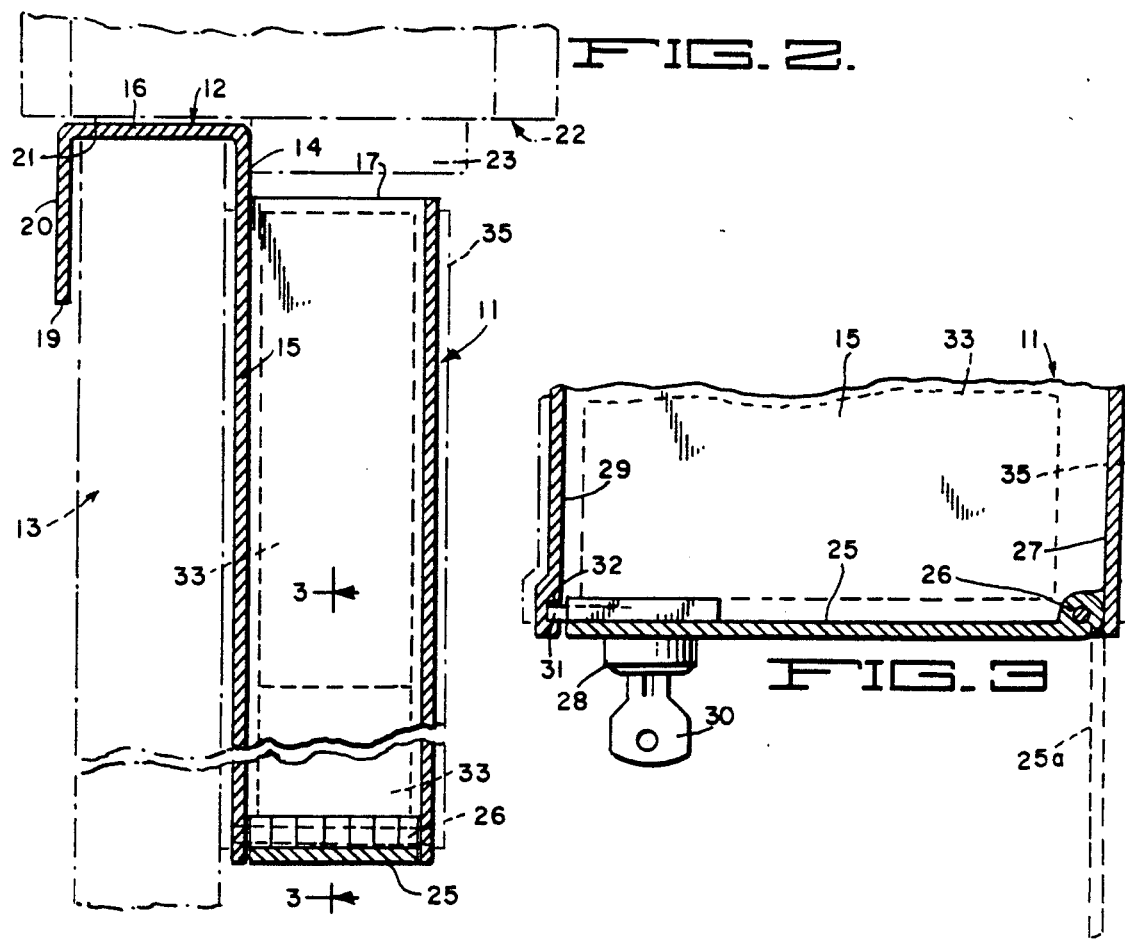
FIG.2
FIG.3

DELIVERY HOUSING FOR VIDEO TAPE CASSETTES AND THE LIKE

BACKGROUND OF THE INVENTION

1. Field of the Invention

This invention relates to a housing for receiving and temporarily storing video tape cassettes and the like and has particular reference to a housing particular adapted for mounting on an entrance door of a residence to permit cassettes to be load in or removed therefrom only by a delivery person or by the intended viewer.

2. Description of the Prior Art

The increased popularity of video cassette recorders (VCRs) has given rise to the business of renting video tape cassettes containing tapes of pictorial and graphic works such as screenplays, documentaries, etc. Consequently rental firms have been established for the purpose of renting such tape cassettes. It is often inconvenient, however, for viewers to travel to rental outlets to pick up cassettes, then return the after they have been viewed.

Accordingly, it would be helpful to have a delivery service so that desired cassettes could be delivered by an employee of a rental outlet to the renter's residence and picked up later, possibly to be replaced by other cassettes. But it is not always feasible for the delivery person to deliver such cassettes when the viewer is at home or is otherwise available and it would be too risky to leave the cassettes on the customer's doorstep if he or she were not home.

A principal obJect of the present invention is to provide means for use at a viewer's residence to receive and safeguard delivered tape cassettes and the like.

Another object is to provide a housing for such purpose which can be easily and securely mounted on an entrance door without the need of tools.

A further obJect is to provide a housing of the above type such that cassettes stored therein can be removed only by one with authority to do so.

A still further obJect is to provide such a housing which is simple and economical to manufacture.

SUMMARY OF THE INVENTION

According to the invention, a housing is provided which is open at its upper end and has a bracket arranged to fit over an entrance door in such manner as to require opening of the door to remove the housing and take out any cassettes stored therein. The housing has a lockable member which can be opened only by a delivery person for access to its interior for cassette delivery or pickup purposes. This frees the viewer from the need of having to use a key or other unlocking means to gain access to the interior of the housing and prevents unauthorized persons from removing the housing or taking any cassettes stored therein.

Thus, the delivery person can drop off cassettes for renters when they are not home in such fashion as to safeguard them against theft.

BRIEF DESCRIPTION OF THE DRAWING

The manner in which the above and other obJects of the invention are accomplished will be readily understood from the following specification considered in conJunction with the accompanying drawing, wherein:

FIG. 1 is a fragmentary perspective view of a delivery housing embodying a preferred form of this invention mounted on the entrance door of a residence.

FIG. 2 is an interrupted vertical sectional view thereof taken along line 2—2 of FIG. 1.

FIG. 3 is a fragmentary sectional view thereof, taken along line 3—3 of FIG. 2.

DESCRIPTION OF THE PREFERRED EMBODIMENT

Referring to the drawing, there is shown a delivery housing in accordance with this invention comprising an elongate tubular container 11 which is rectangular in cross section and open at the top. It is provided with a hanger bracket 12 of substantially inverted U-shape for use in hanging the container in an upright position from the top of an entrance door 13, shown partly ajar in FIG. 1.

A depending leg 14 of bracket 12 is formed integral with the rear wall 15 of the container 11 to locate a cross piece 16 a short distance above the level of the upper end 17 of the container 11. The other leg 20 of the bracket extends below the level of the upper end 17. The leg 20 need not fit snugly against the side of the door 13 may be spaced a short distance from it as indicated at 19 to enable the bracket to fit over doors of different thicknesses.

In accordance with common building construction practice, the door 13 is mounted on suitable hinges (not shown) for movement about a vertical axis from its closed position shown in dotted lines in FIG. 2, where it fits within an opening 21 in a door frame 22 (see FIG. 1), to an open position. A stop strip 23 is suitably attached to the door frame in the opening 21 to limit closing movement of the door.

It will be noted from FIG. 2 that when the door 13 is in its closed position, there illustrated, container 11 cannot be removed from the door. Also, the upper end of the container is located within the doorway formed by the door frame 22, and only a short distance below the stop strip 23, so that access to the upper end of the container is barred while the door is closed.

The lower end of container 11 is normally closed by a closure member 25 which is hinged at one end at 26 to a first lateral wall 27 of the container. A lock 28 of conventional construction is mounted at the opposite end of the member 25. The lock has a bolt 31 which when an inserted key 30 is rotated to one setting is moved lengthwise into a keeper notch 32 formed in a second lateral wall 29 of the container to lock the member 25 in closed position. However, when the key 30 is rotated to another setting the bolt 31 is withdrawn, allowing the member 25 to swing down into a vertical position shown by dot dash lines 25a in FIG. 3, thereby allowing one or more video tape cassettes 33, indicated by dot dash lines, to be inserted into or removed from the container.

When one or more tape cassettes are to be delivered to a viewer, the container is hung over the upper edge of the viewer's entrance door and the latter is locked in closed position. A delivery person can then insert the key 30 in the lock 28 and release the member 25, allowing it to drop into its vertical position 25a. The delivery person can then remove from and/or insert in the container one or more cassettes, after which the member 25 is locked in position to enclose the lower end of the container.

When the viewer subsequently opens the door 13, he removes the container 11 by lifting it up until the bracket leg 20 clears the upper edge of the door, at which tim he can turn the container over to remove any cassettes stored therein. At this time, the viewer may insert one or more used cassettes in the container, then replace it on the door where the cassettes will be safeguarded until a delivery person comes again for pickup and/or delivery purposes.

In cases where the container 11 may be exposed to the sun or other heat source that might damage the recordings on video tapes in cassettes therein, a sheath of flexible insulating material indicated by dot dash lines 35, such as a flexible foam plastic, may be stretched around the container to insulate its interior from excess he As will be apparent from the foregoing, I have provided a novel delivery housing for tape cassettes or the like which is extremely simple in construction and economical to manufacture and which will safeguard the cassettes from theft or damage. Also, the viewer may insert or withdraw a cassette or cassettes at any time without having to lock or unlock the container, while the delivery person may likewise insert or withdraw cassettes at any other time without requiring the presence of the viewer.

Obviously obJects other than video tape cassettes may be delivered to and stored in the container.

We claim:

1. A housing for receiving a video tape cassette mountable on a door which is movable between open and closed positions within the opening of a door frame, said housing comprising:

a container open at its upper and lower ends;

an inverted U-shaped bracket integral with the upper end of said container and adapted to be mounted over the upper edge of said door to support said container with its upper end positioned within said opening;

said door and said door frame serving to prevent said container from being removed from the door when said door is in its closed position and said door frame serving to prevent the withdrawal of a cassette from said container through its open upper end when said door is in said closed position;

a closure member for the lower end of said container; and lock means for selectively locking said member in position to close the lower end of said container and for unlocking said member to permit a cassette to be inserted in or removed from said container through said lower end.

2. A housing as defined in claim 1 comprising means pivotally connecting said closure member to said container for movement about a horizontal axis whereby said closure member will hang vertically when it is released by said lock means and the container is mounted on a door for use.

3. A housing as defined in claim 1 including a sheath of heat insulating material extending around said container.

4. A housing as defined in claim 1 including a flexible sheath of heat insulating material stretched in gripping engagement with and around said container.

* * * * *